(12) United States Patent
Johnson et al.

(10) Patent No.: US 7,789,288 B1
(45) Date of Patent: Sep. 7, 2010

(54) BRAZING PROCESS AND MATERIAL FOR REPAIRING A COMPONENT

(75) Inventors: Jere A. Johnson, Greenville, SC (US); Timothy Channel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/533,101

(22) Filed: Jul. 31, 2009

(51) Int. Cl.
*B23K 31/00* (2006.01)
*B23P 6/04* (2006.01)

(52) U.S. Cl. .................. 228/119; 228/248.1; 29/889.1; 420/441; 420/448

(58) Field of Classification Search .................. 228/119, 228/248.1; 29/889.1; 420/441, 448
See application file for complete search history.

(56) References Cited

U.S. PATENT DOCUMENTS

| | | | | |
|---|---|---|---|---|
| 4,908,069 A | * | 3/1990 | Doherty et al. | 148/501 |
| 5,240,491 A | * | 8/1993 | Budinger et al. | 75/255 |
| 5,437,737 A | * | 8/1995 | Draghi et al. | 148/23 |
| 5,628,814 A | * | 5/1997 | Reeves et al. | 75/255 |
| 6,187,450 B1 | | 2/2001 | Budinger et al. | |
| 6,530,971 B1 | | 3/2003 | Cohen et al. | |
| 7,017,793 B2 | * | 3/2006 | Kinstler | 228/119 |
| 7,279,229 B2 | | 10/2007 | Budinger et al | |
| 7,335,427 B2 | | 2/2008 | Sathian | |
| 7,360,678 B2 | * | 4/2008 | Pietruska et al. | 228/119 |
| 7,377,417 B2 | * | 5/2008 | Kinstler | 228/119 |
| 2004/0050909 A1 | * | 3/2004 | Renteria et al. | 228/119 |
| 2007/0154338 A1 | | 7/2007 | Sathian et al. | |

* cited by examiner

*Primary Examiner*—Jessica L Ward
*Assistant Examiner*—Devang Patel
(74) *Attorney, Agent, or Firm*—Hartman & Hartman, P.C.; Gary M. Hartman; Domenica N.S. Hartman (57) ABSTRACT

A process and braze paste suitable for filling and closing voids in relatively thin wall sections of high temperature components, such as an impingement plate of a combustor of a gas turbine engine. The process entails applying at least a first braze paste to the crack to form a braze paste patch comprising powders of first and second alloys and an organic binder. The first alloy has a higher melting temperature than the second alloy, and the powders of the first and second alloys are present in the braze paste patch at a weight ratio of about 30:70 to about 70:30 weight percent. The braze paste patch is then heated to burn off the binder and melt at least the powder of the second alloy to form a brazement within the crack that contains particles of the first alloy dispersed in a matrix formed by the second alloy.

20 Claims, 12 Drawing Sheets

BRAZING PROCESS AND MATERIAL FOR REPAIRING A COMPONENT

BACKGROUND OF THE INVENTION

The present invention generally relates to brazing processes and materials for repairing components that operate at high temperatures. More particularly, this invention relates to a process of filling cracks and other defects in hot gas path components of gas turbines, including through-thickness cracks in relative thin components such as the impingement plate of a gas turbine engine.

Hot gas path components of gas turbines are typically formed of nickel, cobalt or iron-base superalloys with desirable mechanical and environmental properties for turbine operating temperatures and conditions. A particular example is an impingement plate that protects the aft end of a combustion liner cap assembly, through which fuel nozzle assemblies extend into the combustor of a gas turbine engine. Impingement plates may be equipped with effusion cooling holes to promote the ability of the impingement plate to serve as a radiation shield for the cap assembly. Impingement plates are typically thin, one nonlimiting example being about 0.092 inch (about 2.3 mm) in thickness, with the result that through-cracks can develop in the thermally hostile environment near the combustor. Various methods have been used to fill these cracks, including brazing and welding techniques.

As known in the art, brazing repair techniques are performed at temperatures lower than the melting point of the base metal of the component being repaired. Brazing performed on superalloy components has typically involved the use of braze materials in pliable forms such as pastes, putties, slurries, and tapes, as evidenced by commonly-assigned U.S. Pat. Nos. 6,187,450 to Budinger et al., 6,530,971 to Cohen et al., and 7,279,229 to Budinger et al. Brazing techniques using sintered preforms have also been proposed for applying wear resistant materials on bucket surfaces, as taught in commonly-assigned U.S. Pat. No. 7,335,427 to Sathian, and for surface buildup and hardfacing as taught in commonly-assigned U.S. Published Patent Application No. 2007/0154338 to Sathian et al. Brazing pastes, putties, slurries, and tapes generally contain metal particles in a binder that adheres the metal particles together and to the surface(s) being brazed, and then burns off during the brazing operation. The metal particles are typically a mixture of two or more different alloys, one of which contains a melting point depressant (for example, boron or silicon) to achieve a lower melting point than the remaining metal constituents of the braze material. During brazing, the lower melting particles melt to form a liquid that fills voids between the higher melting particles and, on solidification, bonds the high melting particles together and to the substrate material. Difficulties associated with such braze materials include the difficulty of consistently using optimal quantities of the braze material, accurately placing the braze material, and accurately shaping and sizing the braze material for the area being brazed. Other shortcomings may include low densities and excessive porosity and voids created during binder burn-off, resulting in poor mechanical properties for the resulting brazement.

In the case of repairing impingement plates equipped with effusion cooling holes, additional shortcomings include the difficulty of filling small through-cracks in a relatively thin wall section, as well as larger through-openings, in which case the braze material must be sufficiently viscous so that the material doesn't flow away from the area being brazed prior to and during brazing, yet must be capable of completely infiltrating cracks of various widths.

BRIEF DESCRIPTION OF THE INVENTION

The present invention provides a process and one or more braze pastes suitable for filling and closing cracks in relatively thin wall sections of high temperature components, such as an impingement plate of a combustor of a gas turbine engine.

The process generally entails applying at least one braze paste to the crack to form a braze paste patch comprising powders of first and second alloys and an organic binder. The first alloy has a higher melting temperature than the second alloy, and the powders of the first and second alloys are present in the braze paste patch at a weight ratio of about 30:70 to about 70:30 weight percent. The first alloy is either a nickel-base alloy consisting of, by weight, 15.0 to 17.0 molybdenum, 14.5 to 16.5 chromium, 4.0 to 7.0 iron, 3.0 to 4.5 tungsten, up to 2.5 cobalt, the balance nickel and incidental impurities, or a gamma prime-strengthened nickel-base alloy consisting of, by weight, 9 to 11% cobalt, 7 to 9% chromium, 9 to 11% tungsten, 2.5 to 3.5% tantalum, 5 to 6% aluminum, 0.5 to 1.5% titanium 0.6 to 0.8% molybdenum, 1.3 to 1.7% hafnium, 0.03 to 0.08% zirconium, 0.01 to 0.02% boron, 0.13 to 0.17% carbon, the balance nickel and incidental impurities. The second alloy is a nickel-base alloy consisting of, by weight, 19 to 21% chromium, 2.5 to 3.5% tantalum, 2.5 to 3.5% boron, 0.003 to 0.005% yttrium, and the balance nickel and incidental impurities. The braze paste patch is then heated to burn off the binder and melt at least the powder of the second alloy to form a brazement within the crack that contains particles of the first alloy dispersed in a matrix formed by the second alloy.

According to a preferred aspect of the invention, the braze paste is able to form a dense brazement capable of repairing both relative narrow and wide through-cracks, as well as adjoining through-holes, as a result of the braze paste becoming sufficiently fluid at brazing temperatures to completely fill cracks of various widths.

Other aspects and advantages of this invention will be better appreciated from the following detailed description.

DETAILED DESCRIPTION OF THE INVENTION

Figure 1:
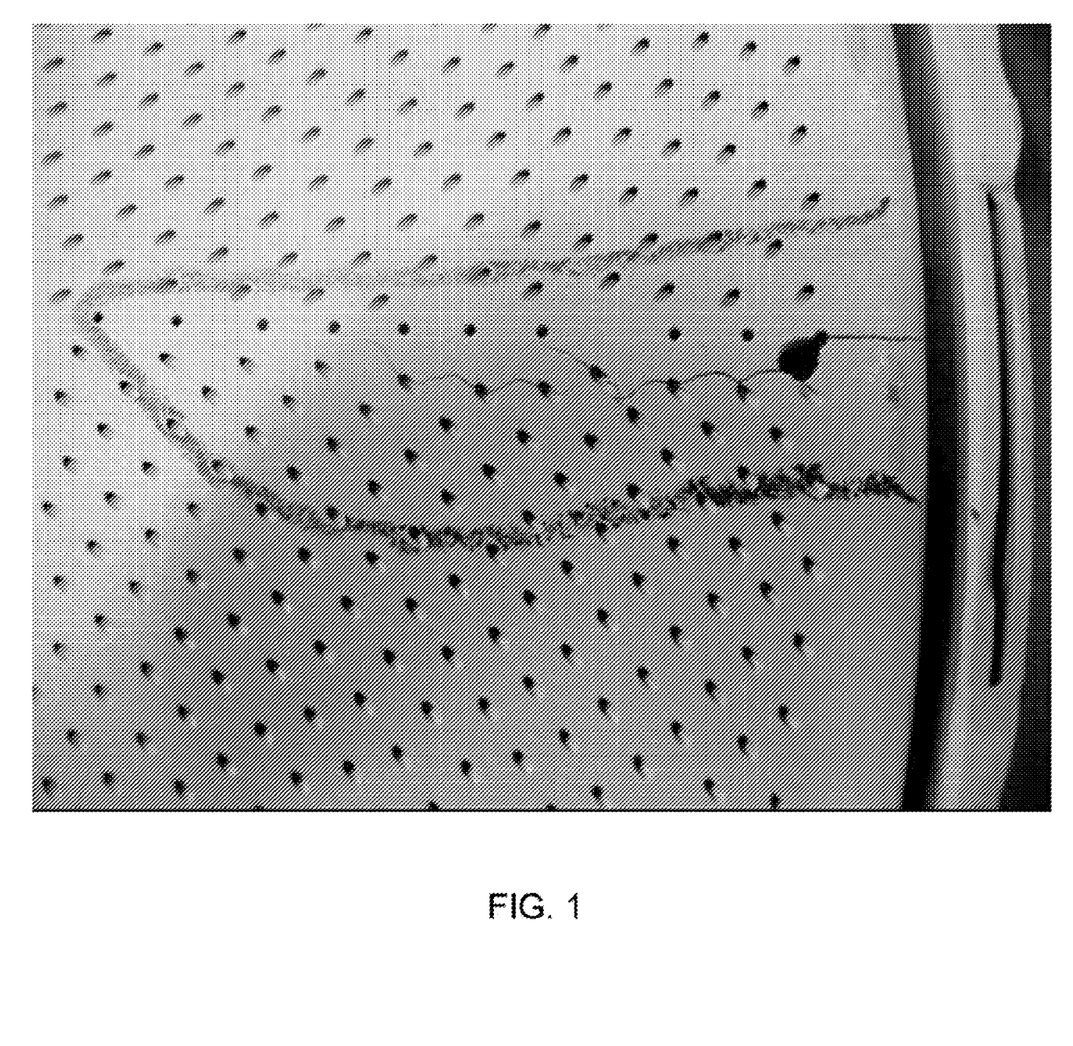
FIG. 1 is a scanned image showing a through-crack in a surface region of an impingement plate for a combustor liner cap assembly of a gas turbine engine.

FIG. 1 shows a surface region of an impingement plate of a type adapted to serve as a radiation shield for a combustion liner cap assembly of a gas turbine engine. The impingement plate is shown as being formed to have a large number of effusion cooling holes that promote the ability of the impingement plate to shield the cap assembly from thermal radiation emitted by the combustor of a gas turbine engine. The impingement plate is formed of a material capable of withstanding the hostile thermal environment of a gas turbine combustor. A notable example of such a material is Hastelloy X, a nickel-base superalloy whose nominal composition has been reported in the literature as, in weight percent, Ni-0.1C-22Cr-9Mo-0.5W-1Co-19Fe. Another notable example of an alloy suitable for impingement plates includes, but is not limited to, Haynes 230, whose nominal composition has been reported in the literature as, in weight percent, Ni-0.1C-22Cr-2Mo-14W-0.3Al-0.5Mn-0.4Si-0.02La.

Impingement plates of the type shown in FIG. 1 are typically thin, for example, on the order of up to about 0.1 inch (about 2.5 mm), a particular example being about 0.092 inch (about 2.3 mm), though lesser and greater thicknesses are foreseeable. Within the hostile thermal environment of a gas turbine combustor, thin impingement plates of the type shown in FIG. 1 can be susceptible to through-cracks, one of which is visible in FIG. 1. The crack is representative of a type that would form as a result of stress cracking, though cracks formed by other processes are also well known. The crack depicted in FIG. 1 is relatively narrow, generally on the order of about one millimeter in width. A hole is also present within the length of the crack, and is wider than the crack by a factor of at least ten. Finally, the crack lies within a region of the impingement plate containing numerous effusion cooling holes, some of which are intersected by the crack. Consequently, the repair of the through-crack and its adjoining through-hole requires the use of a braze paste that is both sufficiently fluid at brazing temperatures to completely fill the crack, yet will also fill and completely close the hole.

In addition to being capable of closing both narrow and wide cracks, preferred properties for the braze paste include chemical and metallurgical compatibility with the alloy being brazed, fatigue strength, low tendency for cracking, oxidation resistance, and machinability. Preferred braze pastes of this invention contain at least one "high melting point" alloy constituent whose properties are similar to those of the alloy being brazed, and at least one "low melting point" alloy constituent having a melting temperature below the melting temperature of the high melting point alloy constituent, and preferably sufficiently low to preserve the desired microstructure of the component during the brazing process.

In an investigation leading to the present invention, braze paste specimens were formulated from mixtures of three different alloys to evaluate candidate braze pastes capable for repairing both narrow and wide through-thickness cracks, as well as through-holes of the type shown in FIG. 1. Two of the three evaluated alloys were selected as high melting point constituents of the braze pastes, while the third was selected as the low melting point constituent. The high melting point constituents were Mar-M 247 and Alloy C-276. MAR-M 247 is a gamma prime-strengthened nickel-base superalloy having a reported composition of, by weight, 9 to 11% cobalt, 7 to 9% chromium, 9 to 11% tungsten, 2.5 to 3.5% tantalum, 5 to 6% aluminum, 0.5 to 1.5% titanium 0.6 to 0.8% molybdenum, 1.3 to 1.7% hafnium, 0.03 to 0.08% zirconium, 0.01 to 0.02% boron, 0.13 to 0.17% carbon, the balance nickel and incidental impurities. The Mar-M 247 composition used in the investigation had a nominal composition of, by weight, about 10% W, 10% Co, 8% Cr, 5% Al, 3% Ta, 1% Hf, 1% Ti, 0.7% Mo, 0.2% C, and the balance nickel and incidental impurities. Alloy C-276 is a nickel-base alloy having a reported composition of, by weight, 15.0 to 17.0% molybdenum, 14.5 to 16.5% chromium, 4.0 to 7.0% iron, 3.0 to 4.5% tungsten, up to 2.5% cobalt, the balance nickel and incidental impurities. The Alloy C-276 material used in the investigation was a powder commercially available from Praxair Technology, Inc., as NI-544 and had a nominal composition of, by weight, about 16% Cr, 16.5% Mo, 4% W, 5.5% Fe, 1% Co, the balance nickel and incidental impurities. Mar-M 247 is known for exhibiting excellent mechanical strength, and Alloy C-276 is known for exhibiting excellent resistance to crack propagation.

The lower melting constituent of the braze paste specimens was Amdry DF-6A, which is a nickel-base alloy having a reported composition of, by weight, 19 to 21% chromium, 2.5 to 3.5% tantalum, 2.5 to 3.5% boron, 0.003 to 0.005% yttrium, and the balance nickel and incidental impurities. The DF-6A composition used in the investigation had a nominal composition of, by weight, about 19.7% Cr, 3.1% Ta, 3.1% B, and 0.001% Y, the balance nickel and incidental impurities.

Figure 2:
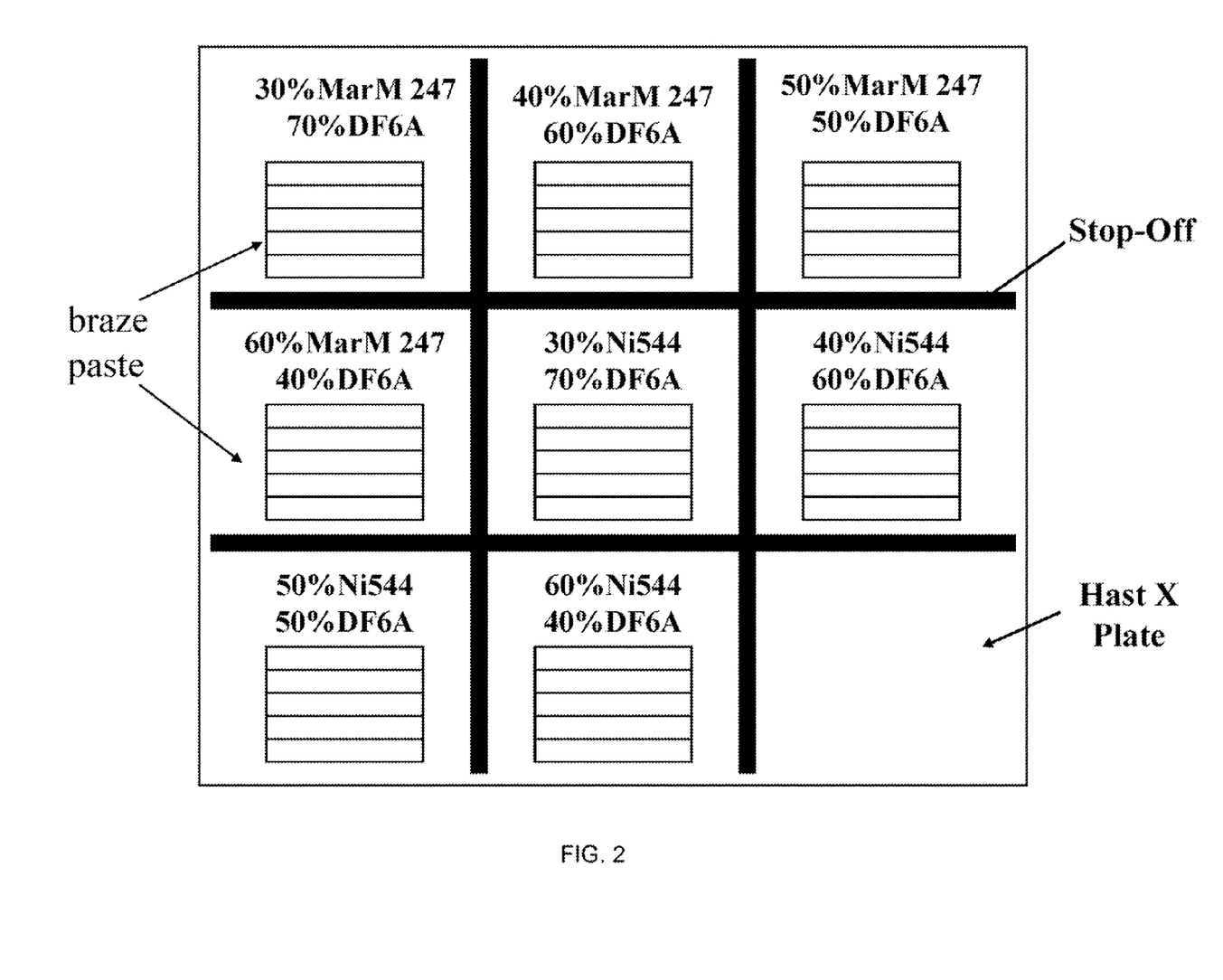
FIG. 2 schematically represents the placement of braze paste specimens evaluated during an investigation leading to the present invention.

In the initial investigation, eight different braze pastes were prepared containing various combinations of DF-6A as the low melting constituent and either Mar-M 247 or Alloy C-276 as the high melting constituent. These alloy constituents were provided in powder form having a particle size of −100+325 mesh. The weight ratio of high to low melting constituents was varied from about 30:70 to about 60:40. The low and high melting constituents were combined with an organic binder to form a paste that was sufficiently viscous to resist flowing under the force of gravity. The organic binder was a polymeric gel available under the name Vitta Pink from the Vitta Corporation and made up about 15 weight percent of the pastes. Each paste specimen was deposited on a plate formed of Hastelloy X. The paste compositions and their placement on the plate are schematically represented in FIG. 2.

Figure 3:
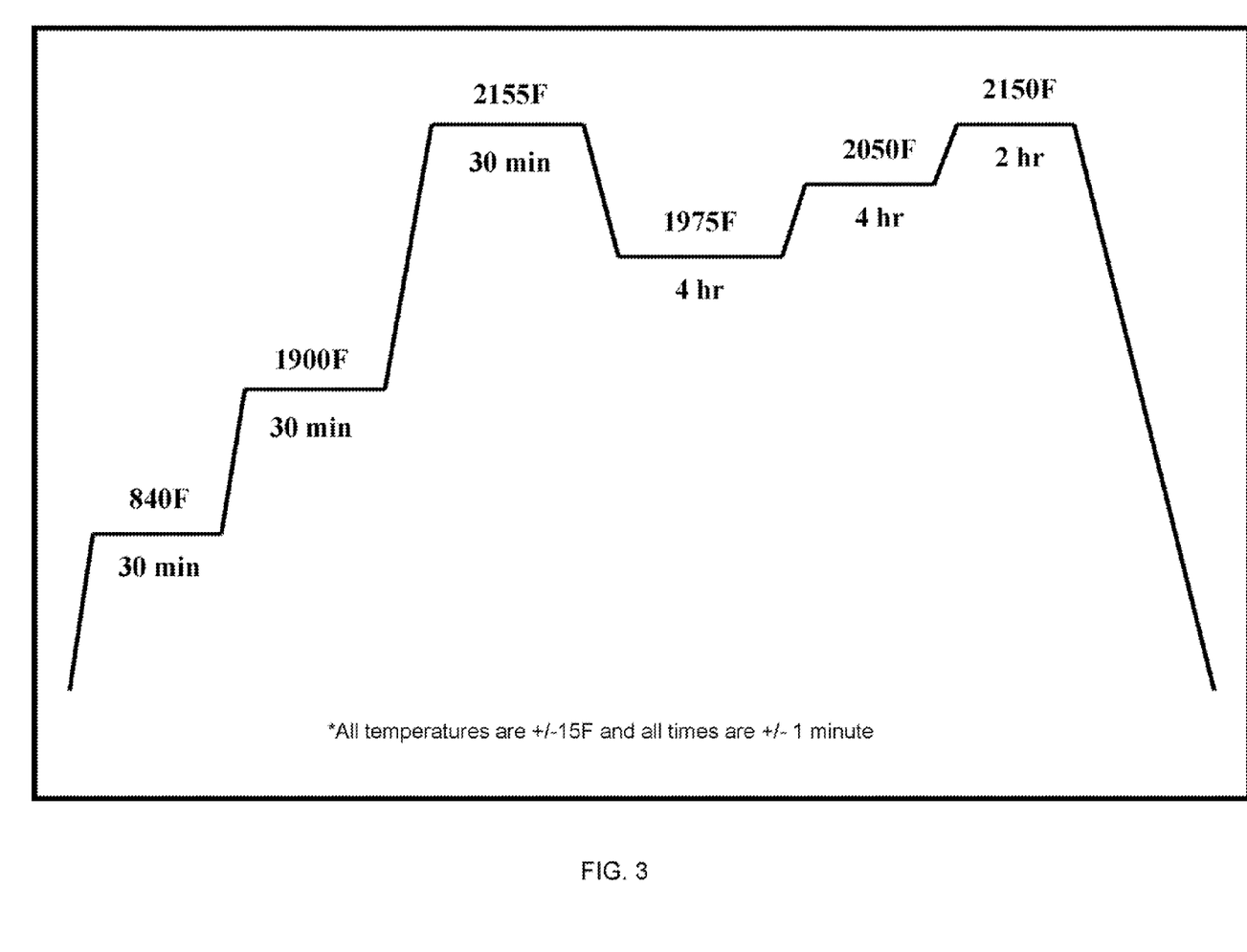
FIG. 3 is a graph representing a braze cycle temperature profile employed during heating of the specimens identified in FIG. 2.

The plate and its paste compositions then underwent a brazing cycle in a vacuum furnace. The brazing cycle is represented in FIG. 3. The 840° F. (about 450° C.) and 1900° F. (about 1040° C.) holds were performed to prevent part distortion, and the 2155° F. (about 1180° C.) hold was performed to ensure full braze liquidus. The 1975° F. (about 1080° C.) hold, 2050° F. (about 1120° C.) hold, and 2150° F. (about 1175° C.) hold were for the purpose of ensuring complete braze liquidus without distortion. As a result of the brazing cycle, the DF-6A powder particles were melted, forming a brazement in which particles of the higher melting constituent (Mar-M 247 or Alloy C-276) were dispersed in a matrix formed by DF-6A.

Figure 4:
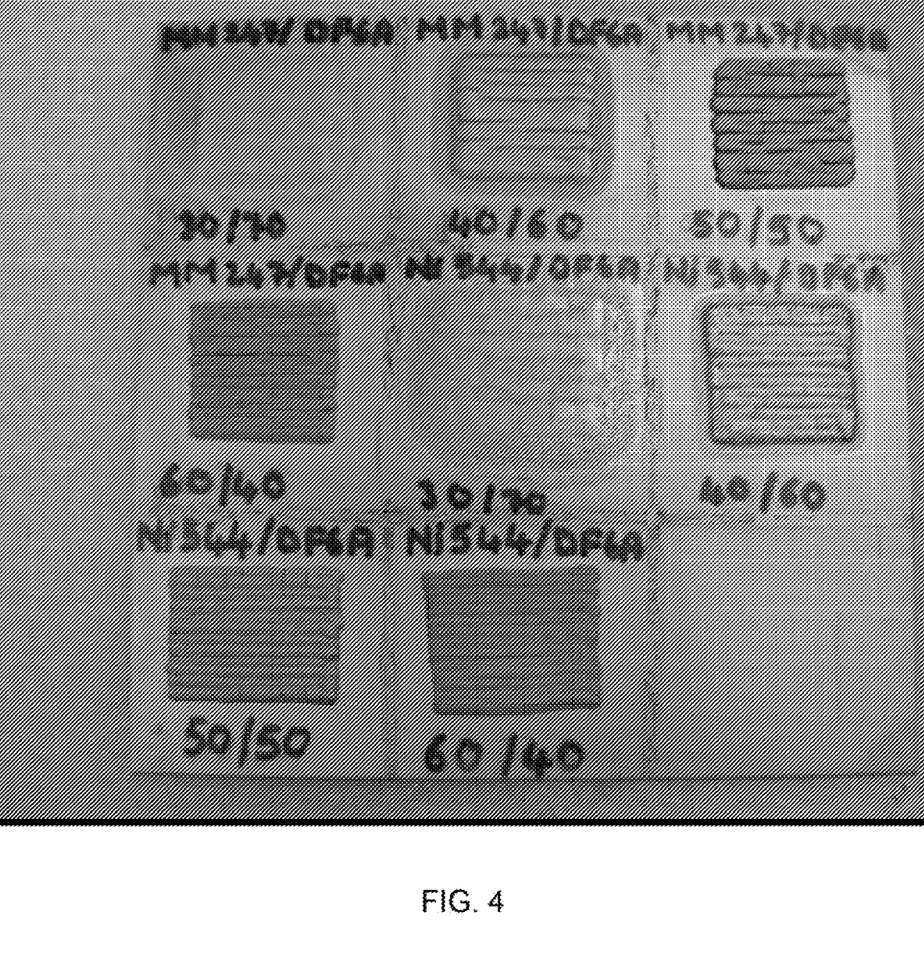
FIG. 4 is a scanned image showing the appearance of brazements formed by the specimens of FIG. 2 following the braze cycle of FIG. 3.
Figure 5:
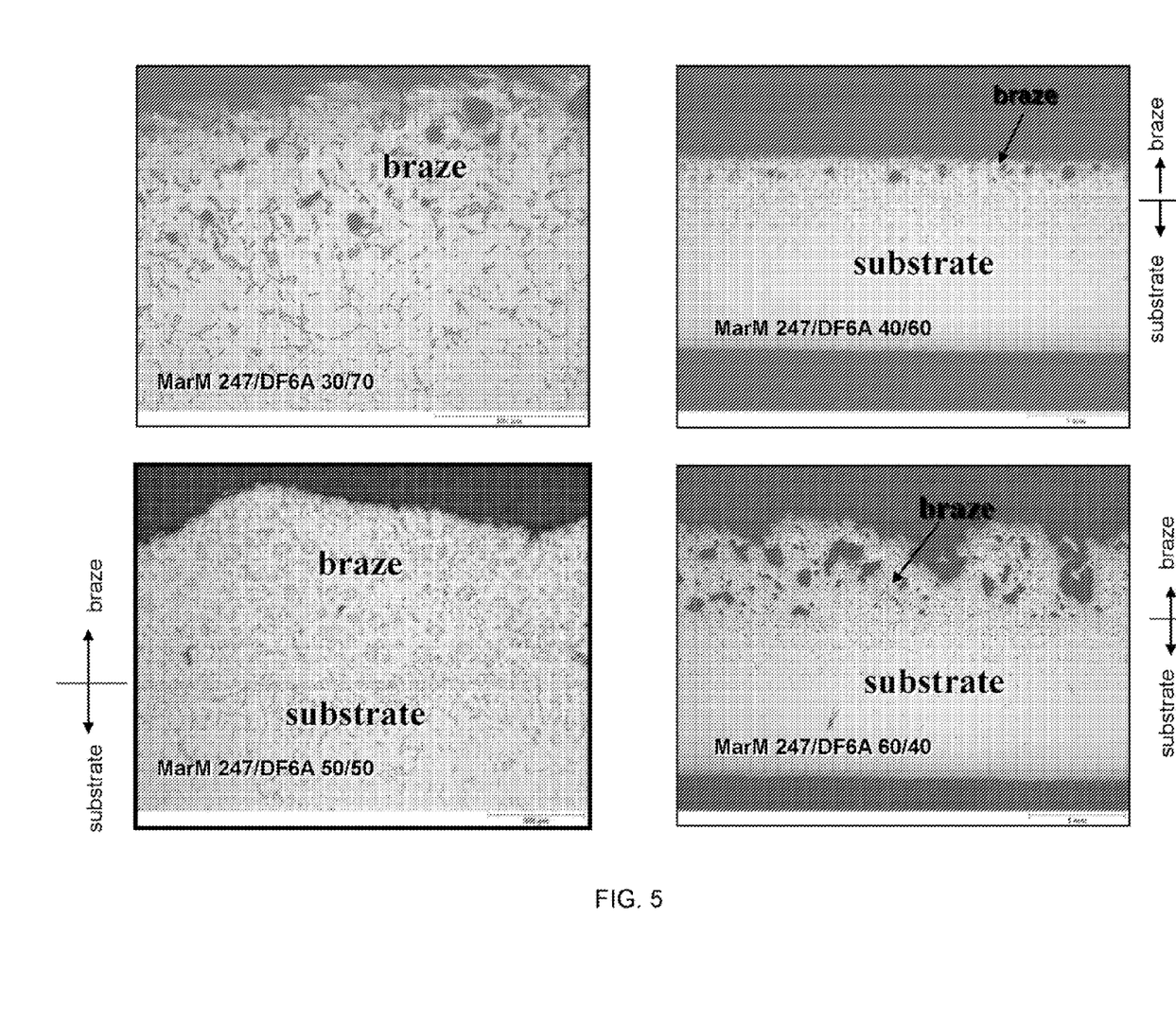
FIGS. 5 and 6 are scanned images showing the cross-sections of some of the specimens of FIG. 4.
Figure 6:
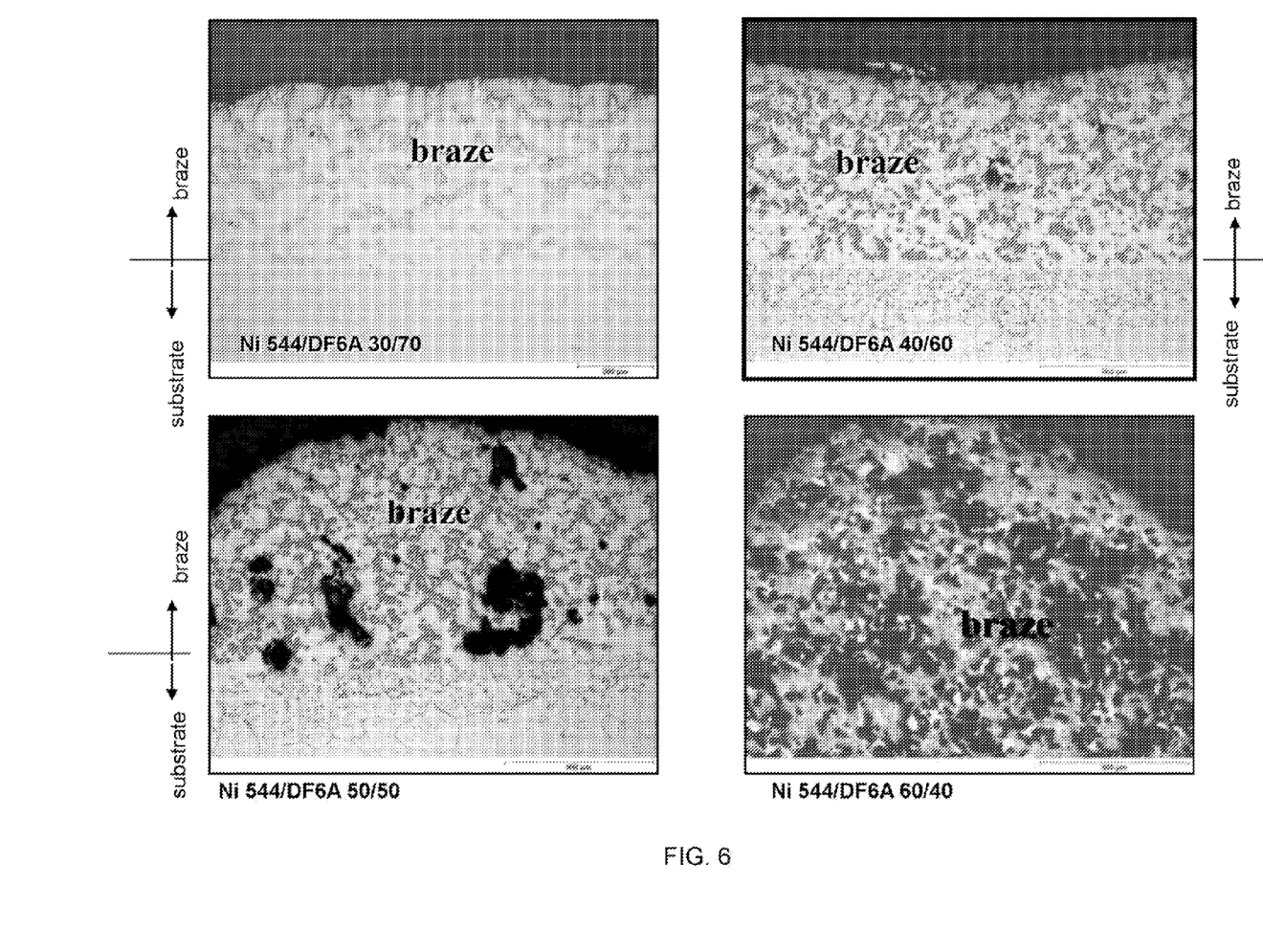

After the brazing cycle, each resulting brazement was visually examined and evaluated for percent porosity by optical microscopy. The brazements as they appeared on the Hastelloy X plate are shown in FIG. 4, and cross-sections of all eight brazements are shown in FIGS. 5 and 6. Because a maximum content of the high melting constituent promotes the overall high temperature capability of the brazement, paste compositions were selected based on having a maximum content of the high melting constituent and a porosity level of 10% or less for each of the two sets of paste compositions containing either Mar-M 247 or Alloy C-276. Due to the porosity evident in the 60/40 Mar-M 247/DF-6A specimen, the 50/50 Mar-M 247/DF-6A specimen was initially selected as a more optimal paste composition when Mar-M 247 is used as the high melting constituent. Similarly, the porosity evident in the 50/50 Alloy C-276/DF-6A specimen prompted the initial selection of the 40/60 Alloy C-276/DF-6A specimen for further testing of paste compositions using Alloy C-276 as the high melting constituent.

Brazements formed with the braze paste compositions were then evaluated with a high cycle fatigue (HCF) test performed per ASTM E466 on rolled sheet specimens of Hastelloy X (thickness of 0.060 to 0.066 inch (about 1.5 to about 1.7 mm)) using the 50/50 Mar-M 247/DF-6A and 40/60 Alloy C-276/DF-6A compositions. Conditions of the test were 30 Hz, fully reversed (R=−1; A=infinity) at stress levels ranging from about 16 to about 52 ksi (about 110 to about 360 MPa) and a test temperature of about 1300° F. (about 700° C.) to simulate a typical plate failure mode. To simulate effusion cooling holes present in an impingement plate, some HCF specimens were drilled to have holes of about 0.030 inch (about 0.76 mm) diameter with axes about 30 degrees to the plane of the specimens. For comparison, specimens without brazements and with and without drill holes were also tested. Test results evidenced that the 50/50 Mar-M 247/DF-6A and 40/60 Alloy C-276/DF-6A specimens exhibit HCF life at least as good as the baseline specimens, and in some case far better than the baseline specimens.

A second series of investigations were performed on impingement plates formed of Hastelloy X. The impingement plates had been removed from service and their surfaces treated with a dye to locate and characterize cracks extending through the approximately 0.092 inch (about 2.3 mm) thickness of the plates. The plates were then cleaned, either by atomic hydrogen cleaning (AHC) or microgrit blasting to remove oxides. AHC and microgrit blasting are both well-known techniques for removing oxides and other contaminants at relatively low temperatures. In AHC, atomic hydrogen irradiation is used to convert oxides to more volatile oxides. For the investigation, the AHC technique was performed at temperatures of about 2150° F. (about 1180° C.), and atomic hydrogen irradiation was delivered as six discrete pulses, each having a duration of about one to two milliseconds.

Figure 7A:
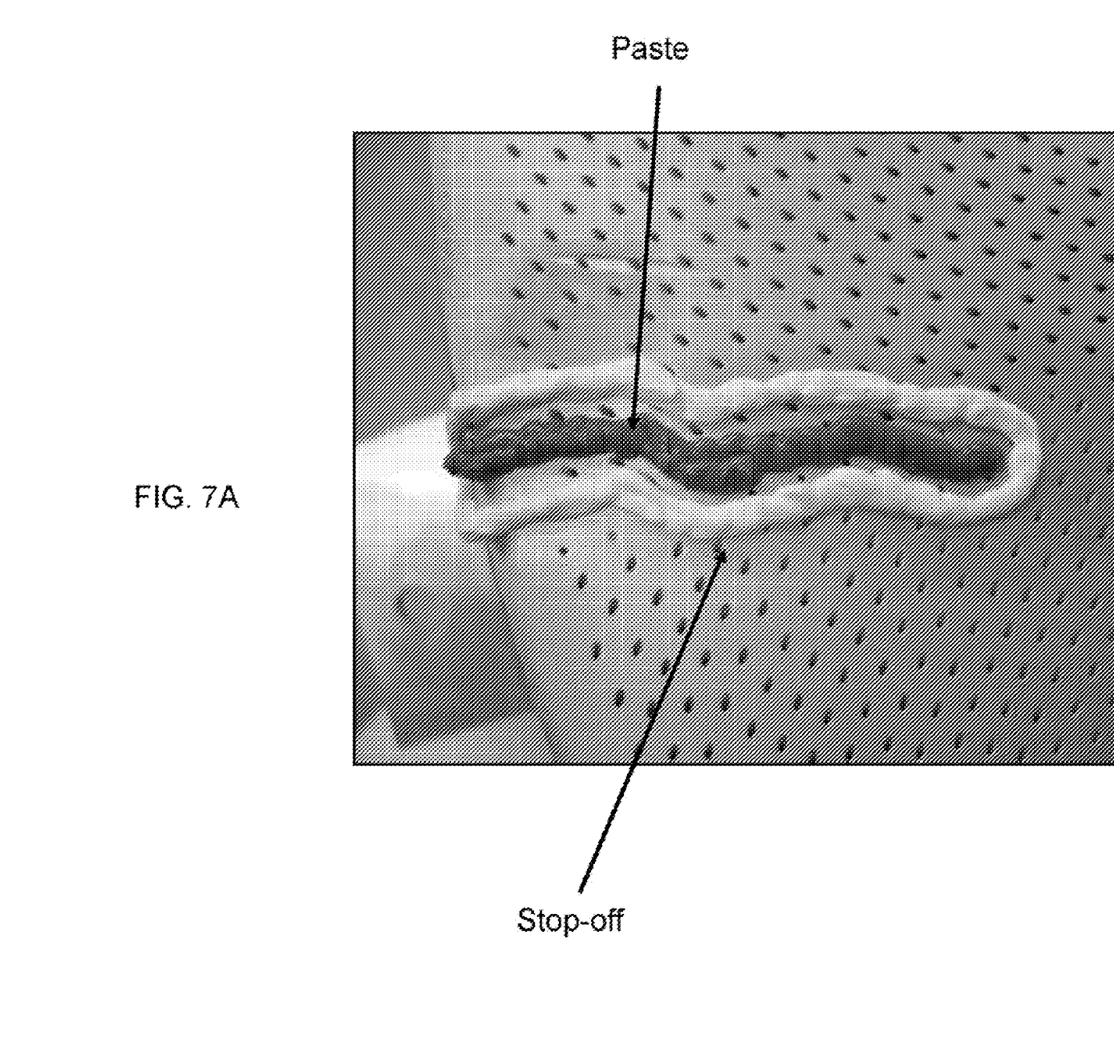
FIG. 7A is a scanned image showing the placement of a braze paste specimen on a narrow through-crack of an impingement plate during a second investigation leading to the present invention.
Figure 7B:
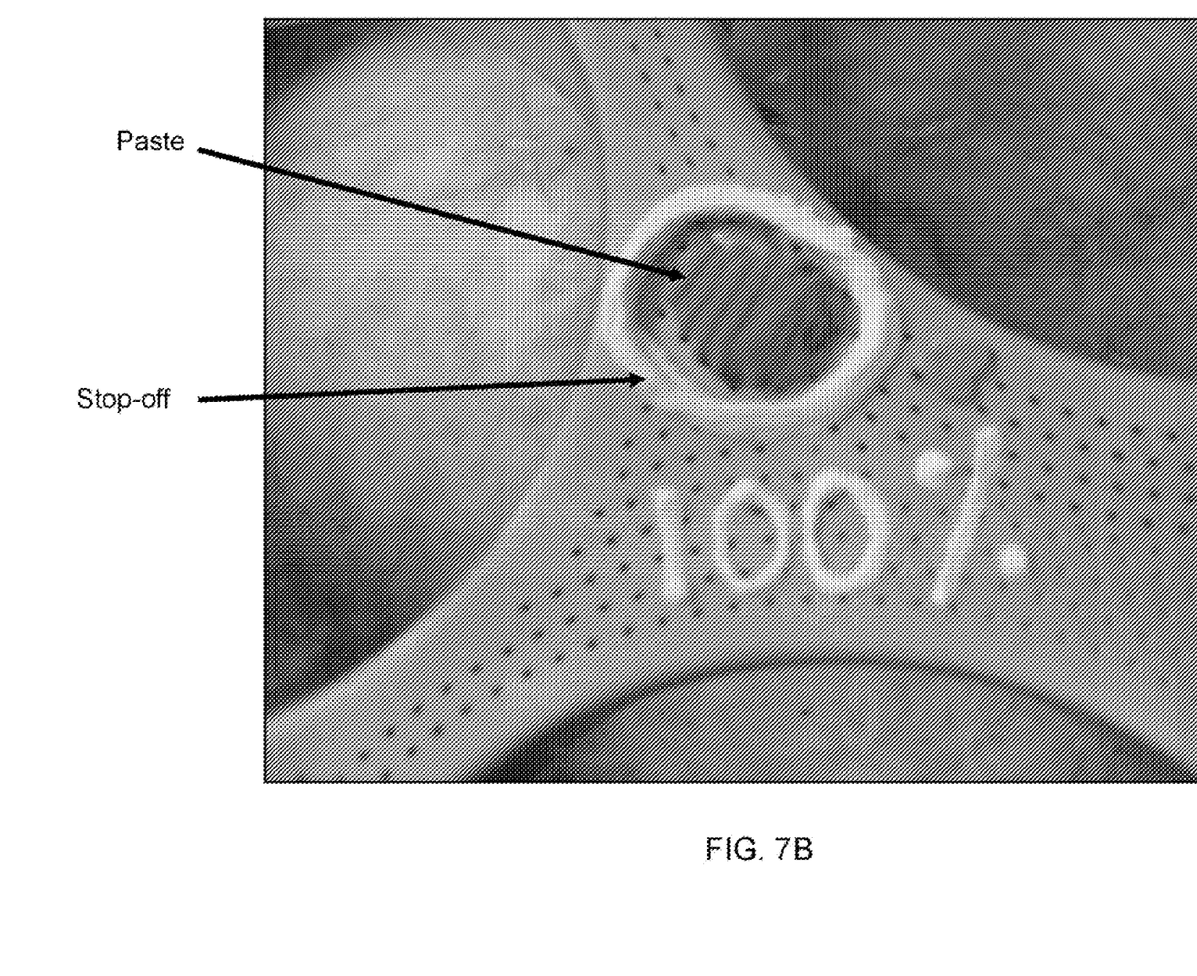
FIG. 7B is a scanned image showing the placement of a braze paste specimen on a wide through-crack of an impingement plate during the second investigation.

FIG. 7A depicts a Mar-M 247/DF-6A braze paste prepared in accordance with the initial investigation to have a 30:70 Mar-M 247 to DF-6A weight ratio. The braze paste was applied to a narrow through-thickness crack in an impingement plate. The paste is shown generally in the form of a patch that is surrounded by a liquid braze-blocking ("stop-off") composition containing fine oxide particles suspended in a liquid carrier medium. FIG. 7B depicts a Mar-M 247/DF-6A paste applied to a relative wide through-thickness crack in a second impingement plate, again surrounded by stop-off Whereas the crack in FIG. 7A was no more than about one millimeter in width, the crack in FIG. 7B was greater than one millimeter in width. For the purpose of filling the much larger crack of FIG. 7B, the paste was applied in two steps with two different paste compositions. The first paste contained about 85 weight percent of the Mar-M 247 powder and the balance binder, and was applied to fill the crack, after which the second paste containing about 85 weight percent of the DF-6A powder and the balance binder was applied to encapsulate the first paste, yielding a braze paste patch containing the Mar-M 247 and DF-6A braze pastes at a weight ratio of about 1:1. The impingement plates were then placed in a vacuum furnace and underwent the same brazing cycle as represented in FIG. 3.

Figure 8A:
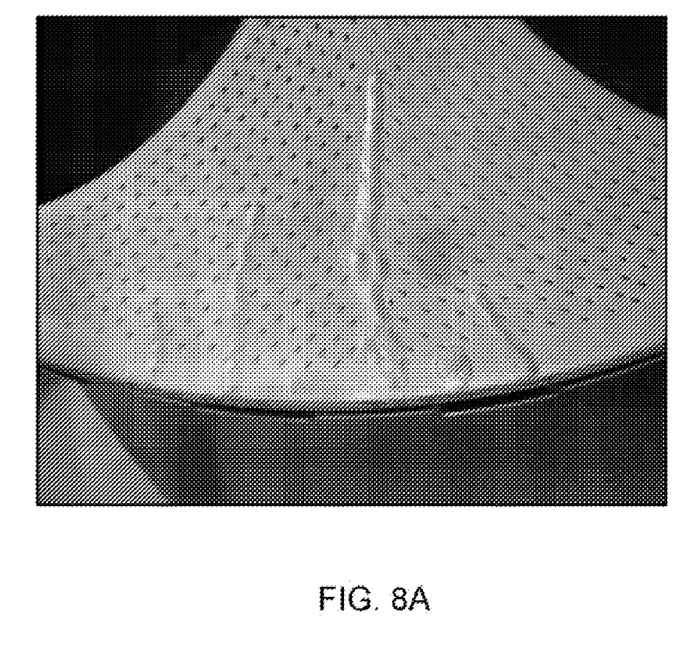
FIGS. 8A and 8B are scanned images showing the brazement formed during the repair of a narrow through-crack similar to that of FIG. 7A.
Figure 8B:
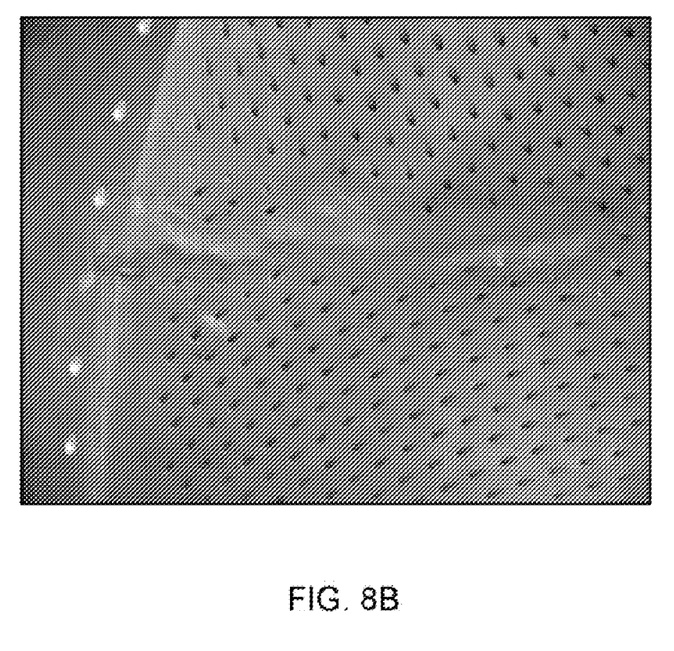
Figure 9A:
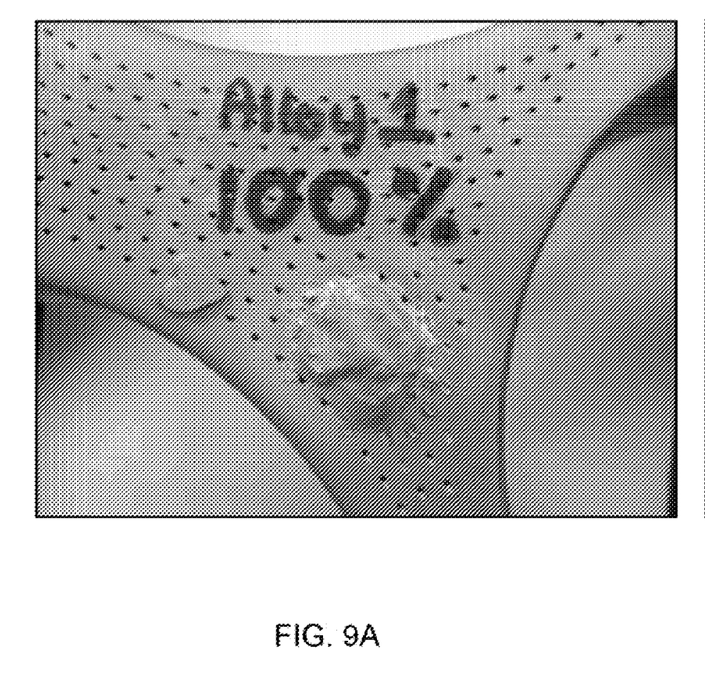
FIGS. 9A and 9B are scanned images showing the brazement formed during the repair of the wide through-crack of FIG. 7B.
Figure 9B:
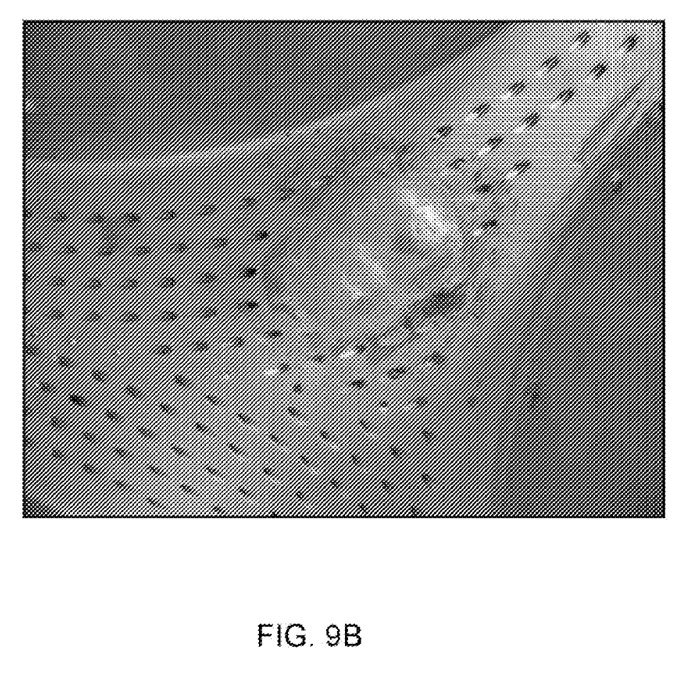
Figure 10:
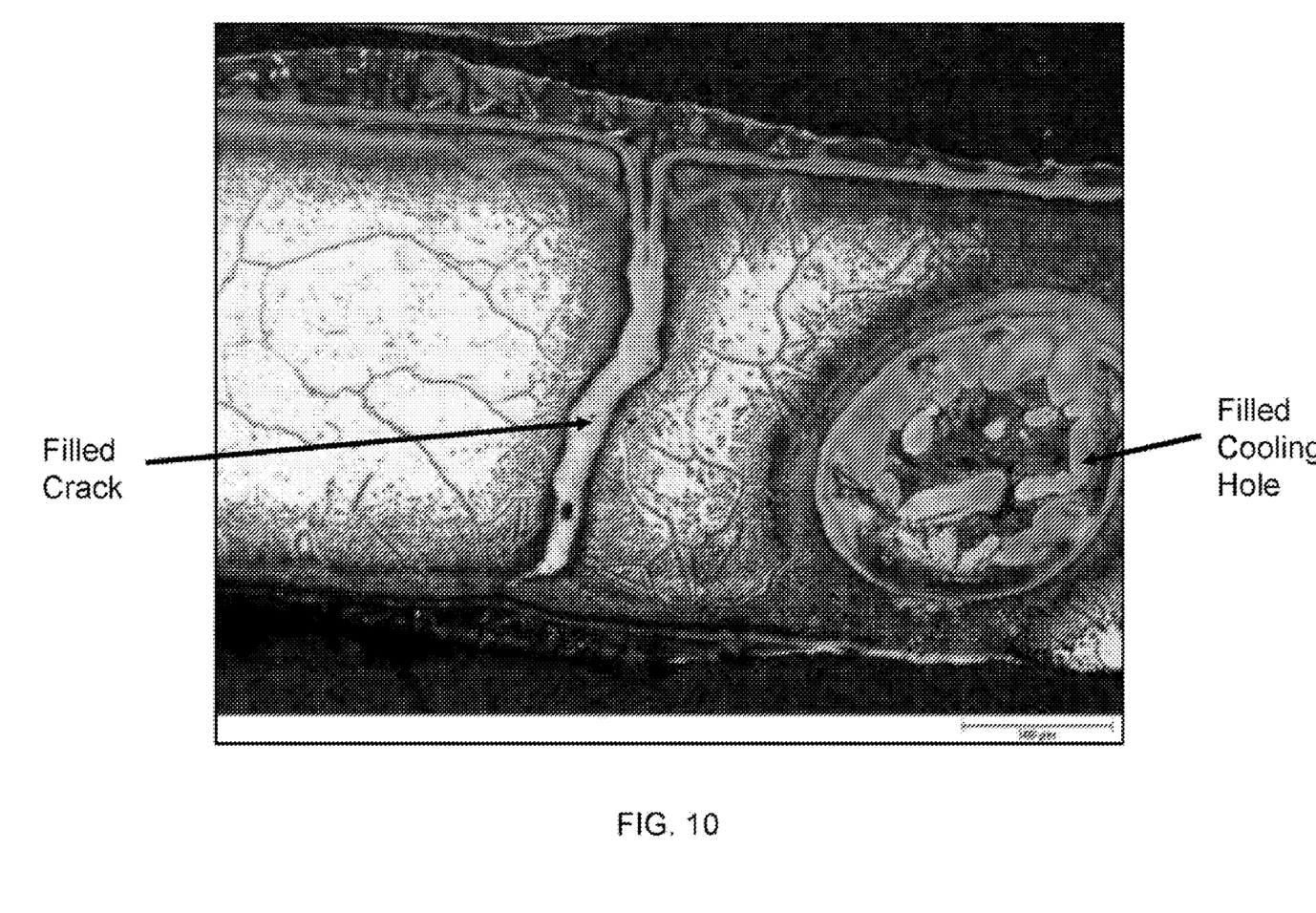
FIGS. 10 and 11 are scanned images showing the cross-sections of, respectively, narrow and wide through-cracks in impingement plates repaired during the second investigation.
Figure 11:
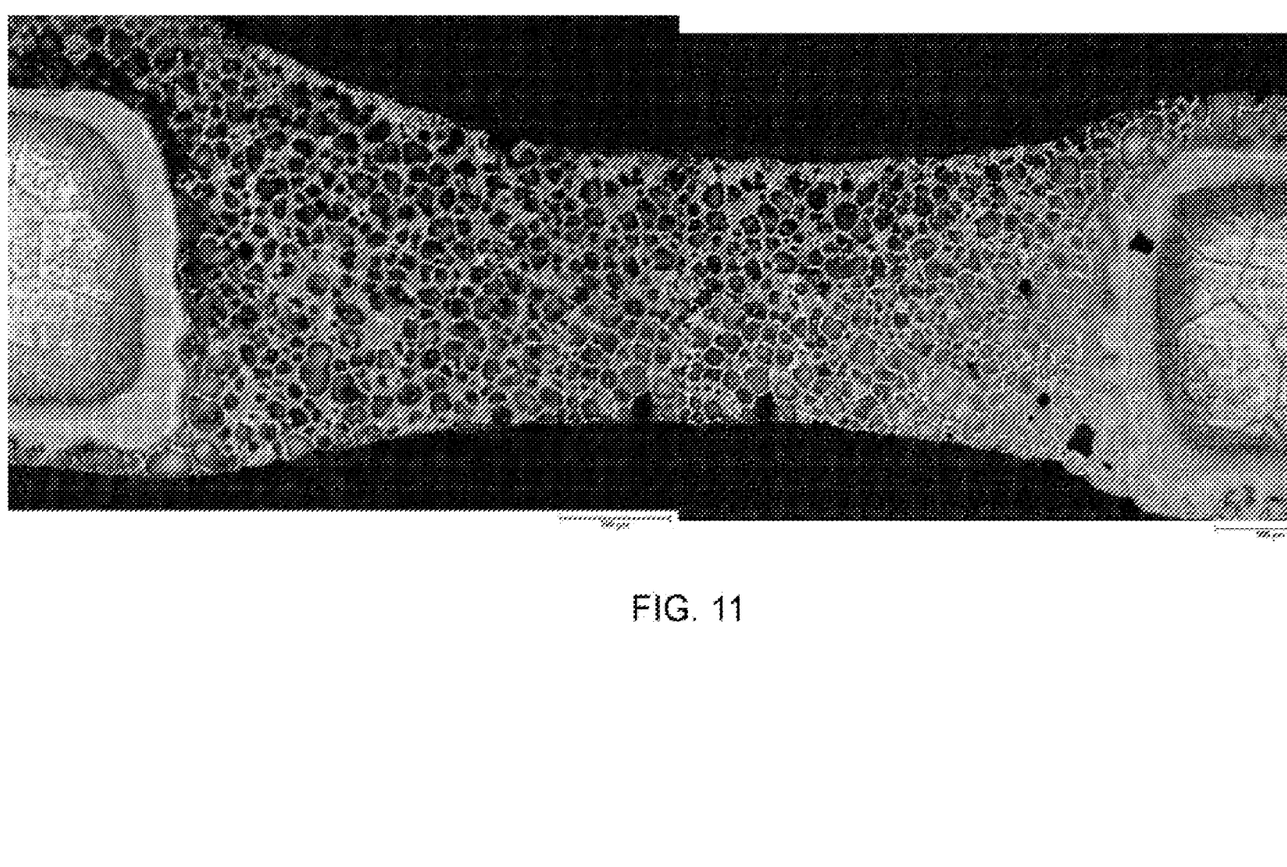

After the brazing cycle, the resulting brazements were visually examined and evaluated by optical microscopy. The topside and backside of one of the brazements used to repair a narrow crack are shown in FIGS. 8A and 8B, respectively, and the topside and backside of the brazement that repaired the wide crack of FIG. 7B are shown in FIGS. 9A and 9B, respectively. Cross-sections of one of the narrow cracks and one of the wide cracks repaired in the investigation are shown in FIGS. 10 and 11, respectively. Both images in FIGS. 10 and 11 evidence the capability of the Mar-M 247/DF-6A paste composition for repairing through-thickness cracks in thin-walled impingement plates formed of Hastelloy X. As evident from these images, the DF-6A powder particles melted during the brazing cycle, forming a brazement characterized by very low porosity (less than 10%) and containing a dispersion of particles of the higher melting Mar-M 247 powder.

The impingement plates cleaned by atomic hydrogen cleaning in the prior investigation were then further evaluated to assess the effectiveness of the AHC technique. Comparisons between impingement plates treated with a single pulse and multiple pulses of hydrogen ions evidenced that a single pulse was generally insufficient to remove oxides from the surfaces to be brazed, and could lead to inadequate bonding of the brazement to the base metal of the repaired component.

From the investigations described above, a particularly preferred but nonlimiting process for preparing and brazing an impingement plate is believed to entail the following steps. After cold working and straightening any gross defects surrounding a crack to be repaired, the impingement plate is treated with a suitable dye to identify cracks. The plate then undergoes cleaning, such as with a steam bath, water bath, steam pressure, etc., followed by microgrit blasting and then atomic hydrogen cleaning at about 2150° F. (about 1175° C.) through the application of six pulses, each about one to two milliseconds in duration. The braze paste is prepared, preferably as a mixture of DF-6A and either Mar-M 247 and Alloy C-276, or in the case of large crack repairs separate pastes, one containing DF-6A and the other containing either Mar-M 247 and Alloy C-276. In view of the results reported above, if the braze paste is a mixture of Mar-M 247 and DF-6A alloy powders, the Mar-M 247 powder may have a particle size of about −100+325 mesh and may constitute from 30 to 70 weight percent, more preferably about 40 to less than 60 weight percent, for example about 50 weight percent, of the alloy powder mixture within the braze paste, and the remainder of the alloy powder mixture is the DF-6A powder, which may also have a particle size of about −100+325 mesh. If the braze paste is a mixture of Alloy C-276 and DF-6A alloy powders, the Alloy C-276 powder may have a particle size of about −100+325 mesh and may constitute from 30 to 70 weight percent, more preferably about 40 to less than 50 weight percent, for example about 45 weight percent, of the alloy powder mixture within the braze paste, and the remainder of the alloy powder mixture is the DF-6A powder, which may also have a particle size of about −100+325 mesh. In the case of large crack repairs, generally having widths of larger than one millimeter, separate braze alloy pastes may be prepared of the DF-6A and either Mar-M 247 or Alloy C-276 alloy powders. Each paste may contain about 15 weight percent of a suitable organic binder, such as the aforementioned Vitta Pink binder, though lesser and greater binder contents are foreseeable and can be used. Suitable compositions for MAR-M 247, Alloy C-276 and DF-6A are believed to be the aforementioned reported compositions for these alloys, though minor modifications or variations outside these ranges are also foreseeable.

The braze paste or pastes are then applied, and if desired surrounded with a stop-off to limit the flow of the liquified braze material during the brazing cycle. If the braze paste contains a mixture of the DF-6A and either Mar-M 247 or Alloy C-276 alloy powders, the paste can be selectively applied to only the crack and immediately adjacent surface areas of the component. In the case of larger crack repairs, the Mar-M 247 or Alloy C-276 braze paste is preferably applied first and fills the crack, and is then encapsulated with the DF-6A braze paste to yield a braze paste patch containing 30 to 70 weight percent, more preferably about 40 to about 60 weight percent, of the Mar-M 247 or Alloy C-276 braze paste, for example about 50 weight percent of the Mar-M 247 or Alloy C-276 braze paste, with the balance being the DF-6A braze paste. The braze cycle is preferably as shown in FIG. 3, though it is foreseeable that other braze cycles could be adapted and used. After brazing, the surfaces repaired by brazing preferably undergo finishing to blend and contour the brazement to the surrounding surfaces. In the case of impingement plates with cooling holes, any holes closed by the brazing process are preferably reopened, for example, by electrical-discharge machining (EDM) or with a water jet or laser.

While the invention has been described in terms of particular embodiments, it is apparent that other forms could be adopted by one skilled in the art. For example, while described with examples in which the repaired component was an impingement plate for a combustor of a gas turbine engine, the braze paste and process are believed to be applicable to the repair of other components, and particularly components formed of nickel-base alloys and having one or more through-thickness cracks in relative thin wall sections. Therefore, the scope of the invention is to be limited only by the following claims.

The invention claimed is:

1. A process of repairing a component formed of a nickel-base alloy, the process comprising:
    applying at least a first braze paste to a void in the component to form a braze paste patch comprising powders of first and second alloys and an organic binder, wherein the first alloy has a higher melting temperature than the second alloy, the powders of the first and second alloys are present in the braze paste patch at a weight ratio of about 30:70 to about 70:30 weight percent, the first alloy is either a nickel-base alloy consisting of, by weight, 15.0 to 17.0% molybdenum, 14.5 to 16.5% chromium, 4.0 to 7.0% iron, 3.0 to 4.5% tungsten, up to 2.5% cobalt, the balance nickel and incidental impurities, or a gamma prime-strengthened nickel-base alloy consisting of, by weight, 9 to 11% cobalt, 7 to 9% chromium, 9 to 11% tungsten, 2.5 to 3.5% tantalum, 5 to 6% aluminum, 0.5 to 1.5% titanium 0.6 to 0.8% molybdenum, 1.3 to 1.7% hafnium, 0.03 to 0.08% zirconium, 0.01 to 0.02% boron, 0.13 to 0.17% carbon, the balance nickel and incidental impurities, and the second alloy is a nickel alloy consisting of, by weight, 19 to 21% chromium, 2.5 to 3.5% tantalum, 2.5 to 3.5% boron, 0.003 to 0.005% yttrium, and the balance nickel and incidental impurities; and then
    heating the braze paste patch to burn off the binder and melt at least the powder of the second alloy to form a brazement within the void that contains particles of the first alloy dispersed in a matrix formed by the second alloy.

2. The process according to claim 1, wherein the void is a through-thickness crack in a wall section of the component, and the wall section has a thickness of up to about 2.5 millimeters.

3. The process according to claim 2, wherein the component comprises cooling holes immediately surrounding the crack.

4. The process according to claim 3, wherein the component is an impingement plate for a combustor of a gas turbine engine.

5. The process according to claim 1, wherein the first alloy powder consists of, by weight, 15.0 to 17.0% molybdenum, 14.5 to 16.5% chromium, 4.0 to 7.0% iron, 3.0 to 4.5% tungsten, up to 2.5% cobalt, the balance nickel and incidental impurities.

6. The process according to claim 5, wherein the powders of the first and second alloys are present in the braze paste patch at a weight ratio of about 40:60 to less than 50:50 weight percent.

7. The process according to claim 1, wherein the first alloy powder consists of, by weight, 9 to 11% cobalt, 7 to 9% chromium, 9 to 11% tungsten, 2.5 to 3.5% tantalum, 5 to 6% aluminum, 0.5 to 1.5% titanium 0.6 to 0.8% molybdenum, 1.3 to 1.7% hafnium, 0.03 to 0.08% zirconium, 0.01 to 0.02% boron, 0.13 to 0.17% carbon, the balance nickel and incidental impurities.

8. The process according to claim 7, wherein the powders of the first and second alloys are present in the braze paste patch at a weight ratio of about 40:60 to less than 60:40 weight percent.

9. The process according to claim 1, wherein the powders of the first and second alloys are mixed together and combined with the binder to form the first braze paste that is applied to the void to form the braze paste patch.

10. The process according to claim 9, wherein the void has a width of up to about one millimeter.

11. The process according to claim 1, wherein the powder of the first alloy is processed to form the first braze paste, the powder of the second alloy is processed to form a second braze paste, the first braze paste is applied to the void, and the second braze paste is applied over the first braze paste to form the braze paste patch.

12. The process according to claim 11, wherein the void has a width of greater than one millimeter.

13. The process according to claim 11, wherein the first and second braze pastes are applied to the void to achieve a weight ratio of about 50:50.

14. The process according to claim 1, wherein the powders of the first and second alloys are present in the braze paste patch at a weight ratio of about 50:50 weight percent.

15. The process according to claim 1, further comprising surrounding the braze paste patch with a liquid braze-blocking composition.

16. The process according to claim 1, wherein the brazement contains less than 10% porosity.

17. A process of filling a crack in an impingement plate of a combustor of a gas turbine engine, the process comprising:
    applying a braze paste to the crack to form a braze paste patch comprising a mixture of powders of first and second alloys and an organic binder, wherein the first alloy has a higher melting temperature than the second alloy, the powders of the first and second alloys are present in the braze paste patch at a weight ratio of 30:70 to 70:30 weight percent, the first alloy is either a nickel-base alloy consisting of, by weight, 15.0 to 17.0% molybdenum, 14.5 to 16.5% chromium, 4.0 to 7.0% iron, 3.0 to 4.5% tungsten, up to 2.5% cobalt, the balance nickel and incidental impurities, or a gamma prime-strengthened nickel-base alloy consisting of, by weight, 9 to 11% cobalt, 7 to 9% chromium, 9 to 11% tungsten, 2.5 to 3.5% tantalum, 5 to 6% aluminum, 0.5 to 1.5% titanium 0.6 to 0.8% molybdenum, 1.3 to 1.7% hafnium, 0.03 to 0.08% zirconium, 0.01 to 0.02% boron, 0.13 to 0.17% carbon, the balance nickel and incidental impurities, and the second alloy is a nickel alloy consisting of, by weight, 19 to 21% chromium, 2.5 to 3.5% tantalum, 2.5 to 3.5% boron, 0.003 to 0.005% yttrium, and the balance nickel and incidental impurities; and then heating the braze paste patch to burn off the binder and melt at least the powder of the second alloy to form a brazement within the crack that contains particles of the first alloy dispersed in a matrix formed by the second alloy.

18. The process according to claim 17, wherein the crack is a through-thickness crack in a wall section of the component, the wall section has a thickness of up to about 2.5 millimeters, and the crack has a width of up to about one millimeter.

19. A process of filling a crack in an impingement plate of a combustor of a gas turbine engine, the process comprising:

preparing first and second braze pastes containing an organic binder and, respectively, powders of first and second alloys, the first alloy having a higher melting temperature than the second alloy, the first alloy being either a nickel-base alloy consisting of, by weight, 15.0 to 17.0% molybdenum, 14.5 to 16.5% chromium, 4.0 to 7.0% iron, 3.0 to 4.5% tungsten, up to 2.5% cobalt, the balance nickel and incidental impurities, or a gamma prime-strengthened nickel-base alloy consisting of, by weight, 9 to 11% cobalt, 7 to 9% chromium, 9 to 11% tungsten, 2.5 to 3.5% tantalum, 5 to 6% aluminum, 0.5 to 1.5% titanium 0.6 to 0.8% molybdenum, 1.3 to 1.7% hafnium, 0.03 to 0.08% zirconium, 0.01 to 0.02% boron, 0.13 to 0.17% carbon, the balance nickel and incidental impurities, the second alloy being a nickel alloy consisting of, by weight, 19 to 21% chromium, 2.5 to 3.5% tantalum, 2.5 to 3.5% boron, 0.003 to 0.005% yttrium, and the balance nickel and incidental impurities;

applying the first and second braze pastes to the crack to form a braze paste patch in which the first and second braze pastes are present at a weight ratio of 30:70 to 70:30 weight percent, the first braze paste being applied to the crack and the second braze paste being applied over the first braze paste to encapsulate the first braze paste and form the braze paste patch; and then heating the braze paste patch to burn off the binder and melt at least the powder of the second alloy to form a brazement within the crack that contains particles of the first alloy dispersed in a matrix formed by the second alloy.

20. The process according to claim 19, wherein the crack is a through-thickness crack in a wall section of the component, the wall section has a thickness of up to about 2.5 millimeters, and the crack has a width of greater than one millimeter.

* * * * *